(12) United States Patent
Ishigami

(10) Patent No.: US 8,179,620 B2
(45) Date of Patent: May 15, 2012

(54) OPTICAL MODULE

(75) Inventor: Yoshiaki Ishigami, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 193 days.

(21) Appl. No.: 12/649,392

(22) Filed: Dec. 30, 2009

(65) Prior Publication Data
US 2010/0172037 A1 Jul. 8, 2010

(30) Foreign Application Priority Data
Jan. 6, 2009 (JP) ................................ 2009-000785

(51) Int. Cl.
*G02B 7/02* (2006.01)
(52) U.S. Cl. ....................................................... 359/819
(58) Field of Classification Search .................. 359/629, 359/676, 819
See application file for complete search history.

(56) References Cited

U.S. PATENT DOCUMENTS

| | | | | |
|---|---|---|---|---|
| 5,579,164 A | * | 11/1996 | Chapnik | 359/618 |
| 2002/0118924 A1 | | 8/2002 | Murata | |
| 2005/0168845 A1 | * | 8/2005 | Minamio et al. | 359/819 |
| 2005/0226569 A1 | | 10/2005 | Sashinaka et al. | |
| 2006/0127017 A1 | | 6/2006 | Saito et al. | |
| 2006/0263003 A1 | * | 11/2006 | Asai et al. | 385/14 |
| 2008/0085077 A1 | | 4/2008 | Miyanari et al. | |

FOREIGN PATENT DOCUMENTS

| | | |
|---|---|---|
| JP | 61-080207 | 4/1986 |
| JP | 11-097797 | 4/1999 |
| JP | 2002-250846 | 9/2002 |
| JP | 2004-163655 | 6/2004 |
| JP | 2005-62842 | 3/2005 |
| JP | 2006-023777 | 1/2006 |
| JP | 2007-324303 | 12/2007 |
| JP | 2008-090099 | 4/2008 |
| JP | 2008-134492 | 6/2008 |
| JP | 2008-203546 | 9/2008 |

OTHER PUBLICATIONS

Japanese Office Action; Application No. 2009-000785 dated Feb. 21, 2012.

* cited by examiner

*Primary Examiner* — Ricky Mack
*Assistant Examiner* — Mahidere Sahle
(74) *Attorney, Agent, or Firm* — Antonelli, Terry, Stout & Kraus, LLP.

(57) ABSTRACT

An optical module according to the present invention comprises an optical element; and a multilayer insulating substrate which is a lamination of a plurality of single-layer insulating substrates and has a light transmission hole for passing light emitted from the optical element. The optical element is flip-chip mounted on the first outermost one of the single-layer insulating substrates. Each single-layer insulating substrate has a through-hole that constitutes a different part of the light transmission hole, the diameters of the through-holes of the single-layer insulating substrates increasing with drawing away the single-layer insulating substrates from the optical element.

12 Claims, 4 Drawing Sheets

OPTICAL MODULE

CLAIM OF PRIORITY

The present application claims priority from Japanese patent application serial no. 2009-000785 filed on Jan. 6, 2009, the content of which is hereby incorporated by reference into this application.

BACKGROUND OF THE INVENTION

1. Field of the Invention

The present invention relates to optical modules in which an optical element is flip-chip mounted on a substrate having therein a light transmission hole for passing light emitted from the optical element.

2. Description of Related Art

Wire bonding is conventionally used to mount an optical element such as a VCSEL (vertical cavity surface emitting laser) on a substrate. FIG. 6 is a schematic illustration showing a cross-sectional view of a conventional optical module employing wire bonding. As illustrated in FIG. 6, wire bonding involves electrically connecting, using a wire 64, an optical element 61 mounted on a substrate 62 with a wiring pattern 63 (or another element). Such wire bonding as illustrated in FIG. 6 has the following problem: The wire 64 has a non-negligible length, and is thus accompanied by an undesirable inductance. The presence of such an inductance makes adjustment of the characteristic impedance difficult, thus leading to degraded high-frequency characteristics.

To address this problem, attention has been directed to flip-chip mounting in which an optical element is electrically connoted to a substrate via bumps (such as Au bumps and solder bumps). Flip-chip mounting is characterized in that it reduces the footprint size and provides excellent electrical characteristics such as good impedance matching.

In surface light emitting/receiving elements such as VCSELs, typically, the light emitting/receiving aperture and the electrodes are formed on the same surface. Therefore, when a VCSEL is flip-chip mounted on a substrate, light is emitted from the surface on which the bumps (electrodes) are formed and the light is directed toward the substrate.

A method for preventing light emitted from (or received by) an optical element from being blocked by a substrate is to use a transparent substrate (see, e.g., JP-A 2006-23777). However, a problem is that such transparent substrates (typically made of glass or transparent resin) have poor thermal conductivity. As a result, an optical element mounted on such a transparent substrate cannot be sufficiently cooled, thus possibly causing malfunctions.

To address this problem, optical modules have been proposed in which a ceramic substrate is used because of its relatively good thermal conductivity compared with substrates of glass or transparent resin, and a light transmission hole is formed to allow light to pass through the ceramic substrate (see, e.g., JP-A 2008-134492). However, such optical modules employing a ceramic substrate have the following problems.

FIG. 7 is a schematic illustration showing a cross-sectional enlarged view of a principal part of a conventional optical module using a ceramic substrate. As illustrated in FIG. 7, light emitted from an optical element 72 unavoidably diverges as it passes through a light transmission hole 73 formed in a ceramic substrate 74. As a result, some of the diverging light advances obliquely and is blocked by the inner wall of the light transmission hole 73 in the ceramic substrate 74.

One possible solution to this problem is to make the ceramic substrate 74 as thin as possible. However, the ceramic substrate 74 thinner than a certain thickness cannot be used from a view point of the mechanical strength.

More specifically, in the optical module 71 in FIG. 7, a lens is disposed on the surface of the ceramic substrate 74 opposite the surface on which the optical element 72 is mounted. In this structure, the lens is preferably as near as possible to the optical element 72 in order to enhance the optical coupling therebetween.

In particular, when an optical element array (in which multiple optical sub-elements are arranged in an array) is used as the optical element 72, the counterpart lenses of the optical sub-elements in the array need to be small in size compared with lenses used in non-array type devices. Accordingly, the distance between the optical element 72 and the lens in array type devices needs to be still shorter than that in non-array type devices.

FIG. 8 is a schematic illustration showing a plan view of a conventional VCSEL array. A VCSEL array 81 in FIG. 8 has multiple VCSEL elements 82 arranged in a line. Each VCSEL element 82 is provided with electrodes (a cathode electrode 83, an anode electrode 84, and two dummy pads 85). The pitch between adjacent VCSEL elements 82 is about 250 μm in the FIG. 8 example. Thus, when the VCSEL array 81 in FIG. 8 is used as the optical element 72, the diameter of the counterpart lens of each VCSEL element 82 needs to be as small as less than 250 μm. Hence, the distance between the optical element 72 and the lens array needs to be sufficiently short to optically couple all of the light emitted from each VCSEL element 82 with its counterpart lens.

However, as mentioned before, it is difficult to form the ceramic substrate 74 thinner than a certain thickness because the resulting substrate is mechanically weak. Therefore, the distance between the optical element 72 and the lens array cannot be made sufficiently short because the distance is limited by the thickness of the ceramic substrate 74.

A possible structure to further reduce the distance between the optical element 72 and the lens array is to increase the diameter of a portion of the light transmission hole 73 (on the side of the lens array) and inserting a part of the lens array in the enlarged portion of the light transmission hole 73. However, the light transmission hole 73 of the ceramic substrate 74 is formed by boring with a borer, a drill, or the like, and therefore it is not easy to form a light transmission hole 73 whose inner diameter varies stepwise or continuously. In addition, formation of such a light transmission hole 73 with varying diameters requires a greater number of processing steps, thus adding to the manufacturing complexity and cost.

SUMMARY OF THE INVENTION

In view of the foregoing, it is an object of the present invention to solve the above-described problems and provide an optical module that has a relatively small distance between the optical element and the lens, yet which can be readily manufactured.

According to one aspect of the present invention, there is provided an optical module which includes an optical element; and a multilayer insulating substrate that is a lamination of a plurality of single-layer insulating substrates and has a light transmission hole for passing light emitted from the optical element, the optical element being flip-chip mounted on the first outermost one of the single-layer insulating substrates, each single-layer insulating substrate having a through-hole that constitutes a different part of the light transmission hole, the diameters of the through-holes of the single-layer insulating substrates increasing with drawing away the single-layer insulating substrates from the optical element.

In the above aspect of the present invention, the following modifications and changes can be made.

(i) The optical module further includes a lens element that is disposed on the surface of the multilayer insulating substrate opposite the surface on which the optical element is mounted; and a part or the whole of the lens element is inserted within the light transmission hole.

(ii) The lens element is a lens block, and a part or the whole of the lens block is fitted in the light transmission hole.

(iii) The lens element is a lens block, and a part or the whole of the lens block is inserted within the light transmission hole by the steps of: inserting the lens block into the light transmission hole and filling an adhesive between the lens block and the light transmission hole; adjusting the position of the lens block; and curing the adhesive.

(iv) An alignment hole for aligning the position of the lens element is formed in the surface of the multilayer insulating substrate on which the lens element is disposed, and an alignment pin is provided to the lens element; and the position of the lens element is aligned by fitting the alignment pin into the alignment hole.

(v) A ground electrode is disposed on the surface of the first outermost single-layer insulating substrate opposite the surface on which the optical element is mounted.

(vi) Each single-layer insulating substrate is made of a ceramic.

ADVANTAGES OF THE INVENTION

According to the present invention, there is provided an optical module that has a relatively small distance between the optical element and the lens, yet which can be readily manufactured.

DETAILED DESCRIPTION OF THE PREFERRED EMBODIMENTS

Preferred embodiments of the present invention will be described below with reference to the accompanying drawings. However, the present invention is not limited to the embodiment described herein.

First Embodiment of the Present Invention

Figure 1A:
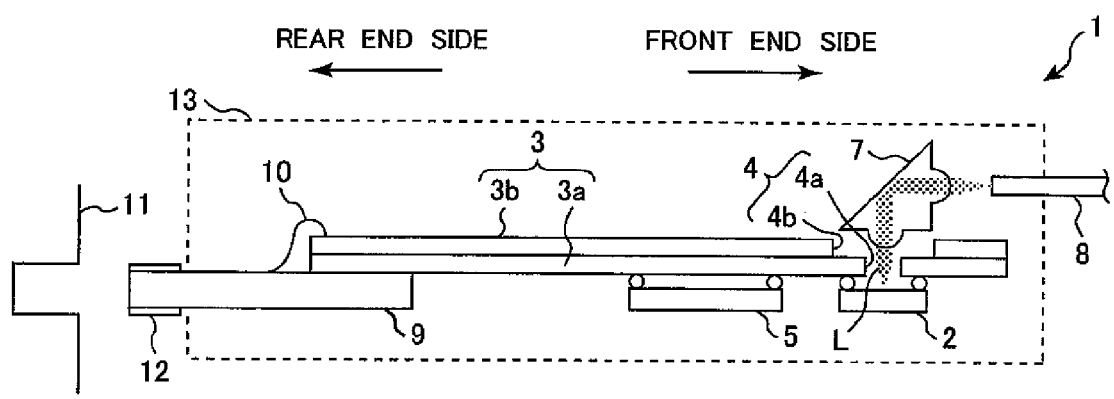
FIG. 1A is a schematic illustration showing a cross-sectional view of an example of an optical module according to a first embodiment of the present invention.

Optical modules according to the present invention can be used, for example, in optical transceivers. FIG. 1A is a schematic illustration showing a cross-sectional view of an example of an optical module according to a first embodiment of the present invention; and FIG. 1B is a schematic illustration showing an enlarged view of a principal part of FIG. 1A.

Figure 1B:
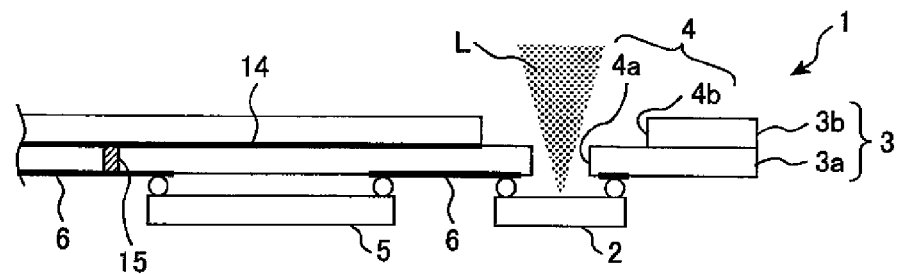
FIG. 1B is a schematic illustration showing an enlarged view of a principal part of FIG. 1A.

As illustrated in FIGS. 1A and 1B, in an optical module 1, an optical element 2 is flip-chip mounted on a multilayer insulating substrate 3, and a light transmission hole 4 for passing light L emitted from the optical element 2 is formed in the multilayer insulating substrate 3. The multilayer insulating substrate 3 is preferably made of a ceramic; however, it may be made of a glass epoxy (such as FR4).

The optical element 2 may be an optical element array in which multiple optical sub-elements are arranged in an array. This embodiment will be described using a VCSEL array as an example of the optical element 2 as well as a multilayer ceramic substrate as an example of the multilayer insulating substrate 3. The reason why such an array type device is used as the optical element 2 is to increase the capacity of transmission. However, the optical element 2 is not limited to such array type devices, but a non-array type device may be used. In addition, light emitting devices other than the VCSEL or light receiving devices such as photodiodes may be used.

The optical element 2 is flip-chip mounted on a surface of the front end side (on the right side in FIG. 1A) of the multilayer ceramic substrate 3, and the light transmission hole 4 is formed in a portion of the multilayer ceramic substrate 3 through which the light L emitted from the optical element 2 passes. An IC (integrated circuit) 5 for driving the optical element 2 is flip-chip mounted on a surface of the rear end side (on the left side in FIG. 1A) of the multilayer ceramic substrate 3, and the optical element 2 and the IC 5 are electrically connected via a wiring pattern (an electrode and conductor pattern) 6 formed on the multilayer ceramic substrate 3.

On the surface of the multilayer ceramic substrate 3 opposite the surface on which the optical element 2 is mounted, there is disposed a lens block 7 (serving as a lens element) that optically couples with the optical element 2; and an optical fiber 8 is disposed to face the lens block 7. In this way, the optical element 2 and the optical fiber 8 are optically coupled via the lens block 7. In this embodiment, the lens block 7 optically couples the optical element 2 with the optical fiber 8 by reflecting the light emitted from the optical element 2 by 90 degrees. However, the invention is not limited to this type of lens element.

A PCB (printed circuit board) 9 is connected to the rear end side of the multilayer ceramic substrate 3. The wiring pattern 6 on the multilayer ceramic substrate 3 and a wiring pattern on the PCB 9 are electrically connected via a wire 10. The connection means between the multilayer ceramic substrate 3 and the PCB 9 is not limited to the above method using the wire 10, and an FPC (flexible printed circuit) may be used instead.

The rear end of the PCB 9 is provided with a connector 12 for connection to an external electrical device 11. Furthermore, a casing 13 is provided to cover and protect the optical element 2, the IC 5, the multilayer ceramic substrate 3, the PCB 9 and others. The lens block 7 and the optical fiber 8 are supported by the casing 13 and other supports (not shown).

The optical module 1 according to this embodiment employs, as the multilayer ceramic substrate 3, a two-layer substrate formed by laminating two single-layer ceramic substrates 3a and 3b. However, the multilayer ceramic substrate 3 is not limited to such a two-layer ceramic substrate, and a multilayer ceramic substrate having three or more layers may also be used.

The two-layer ceramic substrate 3 is formed by laminating the single-layer ceramic substrates 3a and 3b respectively having through-holes 4a and 4b each constituting a different part of the light transmission hole 4. Here, the through-holes 4a and 4b are formed in such a way that the first single-layer ceramic substrate 3a (on which the optical element 2 is mounted) has the smallest diameter, and the diameters of the respective ceramic substrates are gradually increased with drawing away the single-layer insulating substrates from the optical element 2. That is, the through-hole 4b of the second single-layer ceramic substrate 3b is formed to have a diameter larger than the diameter of the through-hole 4a of the first single-layer ceramic substrate 3a (on which the optical element 2 is mounted).

The diameter of the through-hole 4a of the first single-layer ceramic substrate 3a is, e.g., about 100 μm. The diameter of the through-hole 4b of the second single-layer ceramic substrate 3b is formed to be large enough to accommodate a part of the lens block 7. Here, the diameter of the through-hole 4b may exceed the diameter of the surface area required for flip-chip mounting the optical element 2.

As shown in FIG. 1B, on the back surface of the first single-layer ceramic substrate 3a (the surface opposite the surface on which the optical element 2 is mounted), there is formed a ground electrode 14 for adjusting the impedance between the optical element 2 and the IC 5. In addition, a through-hole 15 penetrating the single-layer ceramic substrates 3a and 3b is properly provided.

Next, a method for fabricating the multilayer ceramic substrate 3 will be briefly described. A typical method for fabricating a multilayer substrate includes the steps of: preparing a plurality of sheets; punching each sheet to form one or more through-holes; filling each through-hole of each sheet with a conductive paste; patterning an electrode and conductor pattern on the surface of each sheet to form a thin substrate; and laminating the thus prepared thin substrates.

In this embodiment, two ceramic sheets are prepared as the aforementioned sheets. One of the ceramic sheets is punched to form the through-hole 15, and simultaneously therewith the through-hole 4a is also formed using the same punching method. Subsequently, only the through-hole 15 is filled with a conductive paste while the through-hole 4a is not filled and is left hollow. Then, the wiring pattern 6 (including an electrode pattern and a conductor pattern) is formed on the surface of the thus prepared ceramic sheet, thereby forming the first single-layer ceramic substrate 3a.

In a similar manner, the second single-layer ceramic substrate 3b is fabricated, in which the through-hole 4b having a diameter larger than that of the through-hole 4a of the first single-layer ceramic substrate 3a is formed. Then, the single-layer ceramic substrates 3a and 3b are laminated, pressure bonded, and fired. By this way, the multilayer ceramic substrate 3 is obtained having the light transmission hole 4 whose diameter varies at an intermediate point along its depth.

Thus, the light transmission hole 4 can be readily formed since it can be formed by using conventional methods for forming through-holes. Furthermore, the light transmission hole 4 whose diameter varies at an intermediate point along its depth can be readily formed by laminating the single-layer ceramic substrates 3a and 3b respectively having the through-holes 4a and 4b each with a different diameter.

In the thus fabricated multilayer ceramic substrate 3, the diameter of the through-hole 4b of the second single-layer ceramic substrate 3b can be formed to be sufficiently large to accommodate a part of the lens block 7 serving as a lens element. Thus, the distance between the optical element 2 and the lens block 7 can be reduced.

Figure 2:
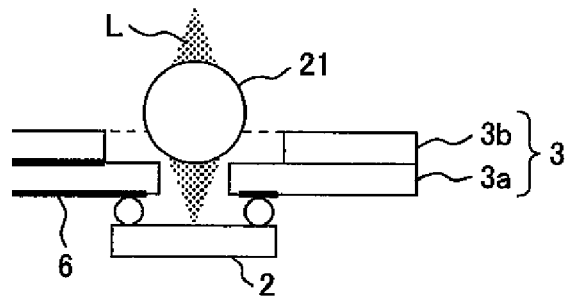
FIG. 2 is a schematic illustration explaining how a lens element is disposed in a light transmission hole.

FIG. 2 is a schematic illustration explaining how a lens element is disposed in a light transmission hole. As illustrated in FIG. 2, the lens element (a spherical lens 21 in FIG. 2) can be partially inserted within at least a part of the second single-layer ceramic substrate 3b. That is, at least a part of the lens element can be disposed deeper than the surface of the second single-layer ceramic substrate 3b and therefore nearer to the optical element 2, thus enabling reduction in the distance between the optical element 2 and the lens element. While FIG. 2 illustrates that the spherical lens 21 is used as the lens element, the lens block 7 can be used with similar effect.

While, in this embodiment, a part of the lens element is inserted within the light transmission hole 4, the entire lens element may be inserted in the light transmission hole 4.

Next, the effects and advantages of this embodiment will be described. In the optical module 1 according to this embodiment, the multilayer (two-layer in the figures) ceramic substrate 3 is formed by laminating the single-layer ceramic substrates 3a and 3b respectively having the through-holes 4a and 4b each constituting a different part the light transmission hole 4. Here, the through-holes 4a and 4b are formed to have a different diameter. That is, the through-holes 4a and 4b are formed in such a way that the first single-layer ceramic substrate 3a (on which the optical element 2 is mounted) has the smallest diameter, and the diameters of the respective single-layer ceramic substrates are gradually increased with drawing away the single-layer insulating substrates from the optical element 2.

In the conventional methods for forming the light transmission hole 4 whose diameter increases with increasing the distance from the optical element 2, different diameter holes need to be sequentially formed starting from the smallest one to the largest one using different diameter drills. However, in such a method, the axes of the different diameter holes may be misaligned.

In this embodiment, the through-holes 4a and 4b (each having a different diameter) are formed in the respective single-layer ceramic substrates 3a and 3b using the same method as used to form the through-hole 15, and then these single-layer ceramic substrates 3a and 3b are laminated together to form the multilayer ceramic substrate 3. Therefore, the light transmission hole 4 (whose diameter increases with drawing away the single-layer insulating substrates from the optical element 2) can be readily formed without causing the axes of the through-holes 4a and 4b to be misaligned. This prevents diverging light emitted from the optical element 2 from being blocked by the substrate.

In addition, the diameter of the through-hole 4b of the second single-layer ceramic substrate 3b can be formed to be sufficiently large to allow a part or the whole of the lens element to be inserted in the light transmission hole 4, and therefore the distance between the optical element 2 and the lens element can be reduced. Hence, even when an array type device is used as the optical element 2, almost all of the light L emitted from the optical element 2 can be optically coupled with the lens element, thus enabling a reduction in light loss.

Further, the multilayer insulating substrate 3 employed in the optical module 1 is made of a ceramic and therefore has a good thermal dissipation capability compared to substrates of a glass or transparent resin. Hence, the optical module 1 having an excellent thermal dissipation capability can be achieved.

Furthermore, by forming the ground electrode 14 on the back surface of the first single-layer ceramic substrate 3a, the distance between the wiring pattern 6 (for connecting the optical element 2 and the IC 5) and the ground electrode 14 can be reduced. Thus, the impedance between the optical element 2 and the IC 5 can be readily adjusted. Moreover, high frequency signals are transmitted between the optical element 2 and the IC 5, and therefore some countermeasures are needed to suppress noises on the transmitted signals. With this embodiment, the formation of the ground electrode 14 can suppress electrical reflections and therefore can reduce noises. Hence, the optical module 1 having good electrical characteristics (such as good impedance matching between the optical element 2 and the IC 5) can be achieved.

Second Embodiment of the Present Invention

Figure 3:
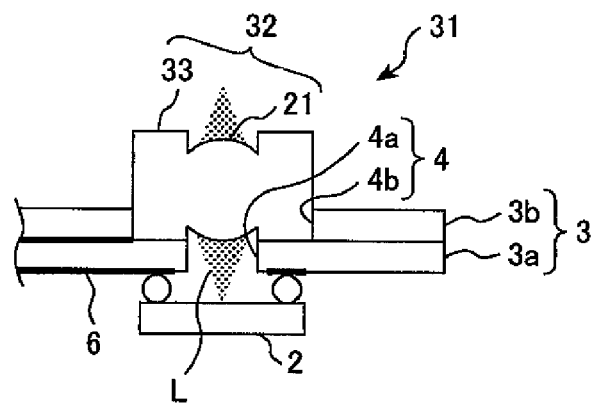
FIG. 3 is a schematic illustration showing a cross-sectional enlarged view of a principal part of an optical module according to a second embodiment of the present invention.

Next, another embodiment of the present invention will be described. FIG. 3 is a schematic illustration showing a cross-sectional enlarged view of a principal part of an optical module according to a second embodiment of the present invention. An optical module 31 illustrated in FIG. 3 has approximately the same structure as the optical module 1 of FIG. 1. However, in the optical module 31, a lens block 32 (serving as the lens element) is fixed to the multilayer ceramic substrate 3 by fitting the lens block 32 into the light transmission hole 4.

In the lens block 32, a spherical lens 21 is sandwiched by supports 33 having a substantially rectangular cross section (when looking perpendicularly at the plane of the drawing in FIG. 3). The lens block 32 is not limited to the above structure, but, similarly to the lens block 7 employed in the optical module 1 of FIG. 1, it may have such a structure that reflects light emitted from the optical element 2 by 90 degrees in order to optically couple the optical element 2 and the optical fiber 8.

In the optical module 31, the through-hole 4b of the second single-layer ceramic substrate 3b is formed to be generally complementary in shape to a part of the lens block 32. Then, this part of the lens block 32 is fitted into the through-hole 4b of the second single-layer ceramic substrate 3b, thereby causing a part of the lens block 32 to be disposed within the light transmission hole 4. With this configuration, the through-hole 4b of the second single-layer ceramic substrate 3b also serves as an alignment hole for aligning the position of the lens block 32, and therefore the lens block 32 can be readily aligned.

Third Embodiment of the Present Invention

Figure 4:
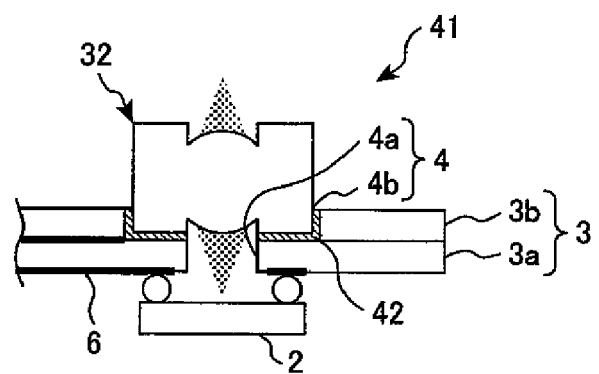
FIG. 4 is a schematic illustration showing a cross-sectional enlarged view of a principal part of an optical module according to a third embodiment of the present invention.

FIG. 4 is a schematic illustration showing a cross-sectional enlarged view of a principal part of an optical module according to a third embodiment of the present invention. An optical module 41 illustrated in FIG. 4 has approximately the same structure as the optical module 31 of FIG. 3. However, in the optical module 41, an adhesive 42 is filled between the lens block 32 and the multilayer ceramic substrate 3.

In the optical module 41, the through-hole 4b of the second single-layer ceramic substrate 3b is formed to be slightly larger than the size of the lens block 32. Then, as mentioned above, the adhesive 42 is filled between the lens block 32 and the multilayer ceramic substrate 3, and next the position of the lens block 32 is adjusted, and then the adhesive 42 is cured.

Typically, the alignment tolerance in lamination of the single-layer ceramic substrates 3a and 3b (e.g., about ±10 µm) is greater than the alignment tolerance required for aligning the lens element (e.g., about ±2 µm). In the optical module 41, the position of the lens block 32 can be fine adjusted. Therefore, even if a misalignment occurs in laminating the single-layer ceramic substrates 3a and 3b, the lens block 32 can be accurately repositioned.

Fourth Embodiment of the Present Invention

Figure 5:
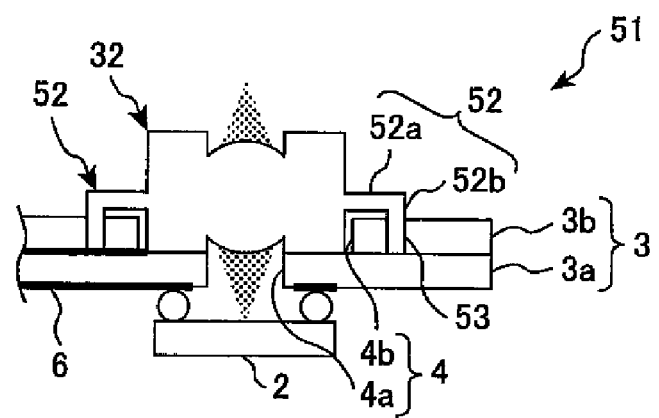
FIG. 5 is a schematic illustration showing a cross-sectional enlarged view of a principal part of an optical module according to a fourth embodiment of the present invention.
Figure 6:
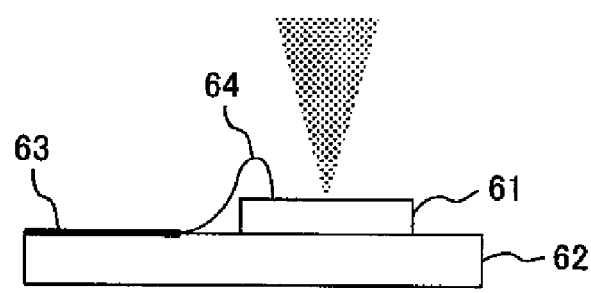
FIG. 6 is a schematic illustration showing a cross-sectional view of a conventional optical module employing wire bonding.
Figure 7:
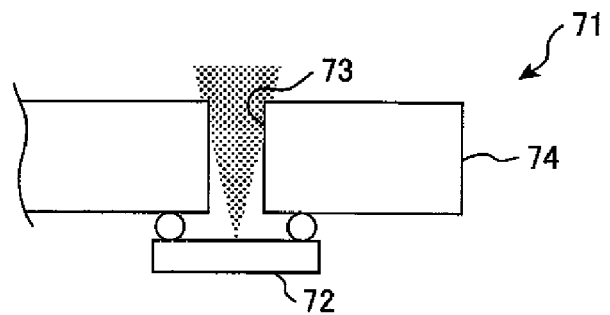
FIG. 7 is a schematic illustration showing a cross-sectional enlarged view of a principal part of a conventional optical module using a ceramic substrate.
Figure 8:
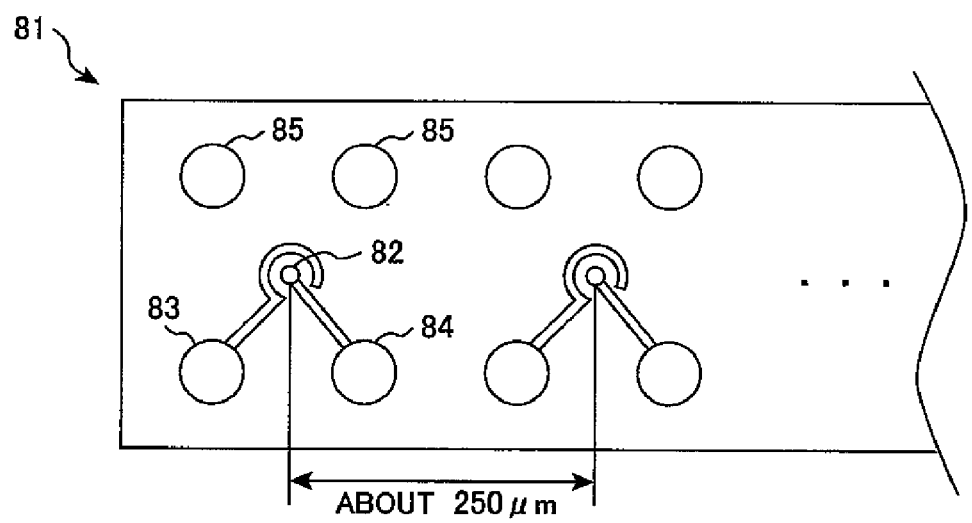
FIG. 8 is a schematic illustration showing a plan view of a conventional VCSEL array.

FIG. 5 is a schematic illustration showing a cross-sectional enlarged view of a principal part of an optical module according to a fourth embodiment of the present invention. An optical module 51 illustrated in FIG. 5 has approximately the same structure as the optical module 31 of FIG. 3. However, in the optical module 51, alignment pins 52 are provided in the lens block 32 and alignment holes 53 are formed in the multilayer ceramic substrate 3. With this structure, the position of the lens block 32 is aligned by fitting the alignment pins 52 into the alignment holes 53.

In the optical module 51 of FIG. 5, two alignment pins 52 are used. One of the alignment pins 52 laterally extends from one side of the lens block 32 in parallel to the multilayer ceramic substrate 3 (a parallel portion 52a) and further extends from the parallel portion 52a perpendicularly towards the multilayer ceramic substrate 3 (a perpendicular portion 52b). The other alignment pin 52 is similarly extended in the opposite direction from the opposite side of the lens block 32. However, the alignment pins 52 are not limited to the above structure in shape or number.

The alignment holes 53 are formed in the surface of the multilayer ceramic substrate 3 on which the lens block 32 is disposed. In this embodiment, each alignment hole 53 is provided by forming a through-hole penetrating the second single-layer ceramic substrate 3b of the multilayer ceramic substrate 3.

The through-hole 4b of the second single-layer ceramic substrate 3b is formed to be slightly larger than the size of the lens block 32. The alignment hole 53 is formed to be generally complementary in shape to a free end portion of the alignment pin 52 (a free end portion of the perpendicular portion 52b).

In the optical module 51, the alignment holes 53 are provided in addition to the light transmission hole 4. With this structure, the position of the lens block 32 is aligned by fitting the alignment pins 52 into the alignment holes 53. Thus, the lens block 32 can be readily aligned without the need for the light transmission hole 4 to also play a role as an alignment hole. The alignment holes 53 can be readily formed using a method similar to that used for the formation of the through-hole 15 and the light transmission hole 4.

In the FIG. 5 embodiment, the alignment pins 52 are directly fitted into the alignment holes 53. However, the alignment pins 52 may be fitted in the alignment holes 53 as follows: The alignment holes 53 are formed to be slightly larger than the size of the free end portion of the alignment pins 52. Then, in the fitting procedure, an adhesive is first filled between the alignment pins 52 and the alignment holes 53, and next the position of the lens block 32 is fine adjusted, and then the adhesive 42 is cured. Thus, similarly to the optical module 41 in FIG. 4, even if a misalignment occurs in laminating the single-layer ceramic substrates 3a and 3b, the lens block 32 can be accurately repositioned.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
a multilayer insulating substrate, having a light transmission hole disposed in a depth direction thereof that is configured to allow light to pass therethrough, the multilayer insulating substrate formed by a lamination of a plurality of single-layer insulating substrates that include a ceramic material, each single-layer insulating substrate having a through-hole, such that a boundary of each through-hole constitutes a different portion of a boundary of the light transmission hole;
an optical element flip-chip mounted on an outermost single-layer insulating substrate, and configured to emit light through the light transmission hole;
wherein a first single-layer insulating substrate is disposed further from the optical element than a second single-layer insulating substrate, and the first single-layer insulating substrate has a through-hole with a larger diameter than a diameter of a through-hole in the second single-layer insulating substrate.

2. The optical module according to claim 1, further comprising:
a lens element disposed on the surface of an outermost single-layer insulating substrate opposite the outermost single-layer insulating substrate on which the optical element is mounted; and
wherein at least a part of the lens element is inserted within the light transmission hole.

3. The optical module according to claim 2,
wherein the lens element includes a lens block, and at least a part of the lens block is fitted in the light transmission hole.

4. The optical module according to claim 2,
wherein the lens element includes a lens block; and
wherein at least a part of the lens block is inserted within the light transmission hole by the steps of:
inserting the lens block into the light transmission hole and filling an adhesive between the lens block and the light transmission hole;
adjusting the position of the lens block; and
curing the adhesive.

5. The optical module according to claim 2, further comprising:
an alignment hole configured to align a position of the lens element formed in the surface of the multilayer insulating substrate on which the lens element is disposed; and
an alignment pin provided in the lens element; and
wherein the position of the lens element is aligned by fitting the alignment pin into the alignment hole.

6. The optical module according to claim 1, further comprising:
a ground electrode disposed on the surface of the outermost single-layer insulating substrate opposite the surface on which the optical element is mounted.

7. An optical module, comprising:
a multilayer insulating substrate means, including a light transmission hole disposed in a depth direction thereof, for allowing light to pass therethrough, the multilayer insulating substrate means formed by laminating a plurality of single-layer insulating substrates that include a ceramic material, each single-layer insulating substrate having a through-hole, such that a boundary of each through-hole constitutes a different portion of a boundary of the light transmission hole;
an optical emission means for emitting light through the light transmission hole, the optical emission means being flip-chip mounted on an outermost single-layer insulating substrate; and
wherein a first single-layer insulating substrate is disposed further from the optical element than a second single-layer insulating substrate, and the first single-layer insulating substrate has a through-hole with a larger diameter than a diameter of a through-hole in the second single-layer insulating substrate.

8. The optical module according to claim 7, further comprising:
a lens means for focusing light, the lens means being disposed on the surface of an outermost single-layer insulating substrate opposite the outermost single-layer insulating substrate on which the optical emission means is mounted; and
wherein at least a part of the lens means is inserted within the light transmission hole.

9. The optical module according to claim 8,
wherein the lens means includes a lens block, and at least a part of the lens block is fitted in the light transmission hole.

10. The optical module according to claim 8,
wherein the lens means includes a lens block; and
wherein at least a part of the lens block is inserted within the light transmission hole by the steps of:
inserting the lens block into the light transmission hole and filling an adhesive between the lens block and the light transmission hole;
adjusting the position of the lens block; and
curing the adhesive.

11. The optical module according to claim 8, further comprising:
an alignment hole means for aligning a position of the lens means formed in the surface of the multilayer insulating substrate on which the lens means is disposed; and
an alignment pin means, provided in the lens element, for aligning the position of the lens means by fitting the alignment pin means into the alignment hole means.

12. The optical module according to claim 7, further comprising:
a ground electrode means for grounding, the ground electrode means being disposed on the surface of the outermost single-layer insulating substrate opposite the surface on which the optical means is mounted.

* * * * *